(12) United States Patent
Lowe et al.

(10) Patent No.: US 7,147,432 B2
(45) Date of Patent: Dec. 12, 2006

(54) TURBINE SHROUD ASYMMETRICAL COOLING ELEMENTS

(75) Inventors: Cedric Carlton Lowe, Cincinnati, OH (US); Andrew Charles Powis, Madeira, OH (US); Jonathan Philip Clarke, West Chester, OH (US)

(73) Assignee: General Electric Company, Schenectady, NY (US)

( * ) Notice: Subject to any disclaimer, the term of this patent is extended or adjusted under 35 U.S.C. 154(b) by 252 days.

(21) Appl. No.: 10/720,430

(22) Filed: Nov. 24, 2003

(65) Prior Publication Data

US 2005/0111965 A1    May 26, 2005

(51) Int. Cl.
*F01D 25/12* (2006.01)
*F01D 25/14* (2006.01)

(52) U.S. Cl. .................. 415/116; 415/173.1; 415/176; 415/178; 165/908

(58) Field of Classification Search ................ 415/115, 415/116, 117, 173.1, 176, 178; 165/908; 60/754, 756, 757
See application file for complete search history.

(56) References Cited

U.S. PATENT DOCUMENTS 5,165,847 A    11/1992    Proctor et al.
5,167,487 A    12/1992    Rock
5,169,287 A    12/1992    Proctor et al.
6,155,778 A *  12/2000    Lee et al. .................... 415/116
6,196,792 B1    3/2001    Lee et al.
6,354,795 B1    3/2002    White et al.

\* cited by examiner

*Primary Examiner*—Christopher Verdier
(74) *Attorney, Agent, or Firm*—William Scott Andes; Steven J. Rosen

(57) ABSTRACT

A turbine shroud assembly asymmetrical cooling element such as a shroud segment or a baffle includes an arcuate panel. The panel has a plurality of cooling apertures extending through the panel and an axially extending midline of the panel parallel to an axis of rotation of the arcuate panel. A symmetric portion of the cooling apertures have a symmetrical density of aperture inlets that is symmetric with respect to the axially extending midline. An asymmetric portion of the cooling apertures have an asymmetrical density of aperture inlets that is asymmetric with respect to the axially extending midline. One exemplary cooling element includes a high density area of the cooling apertures in the asymmetric portion having a higher density of aperture inlets than in the symmetric portion. A low density area of the cooling apertures in the asymmetric portion has a lower density of aperture inlets than in the symmetric portion of the cooling apertures.

13 Claims, 3 Drawing Sheets

TURBINE SHROUD ASYMMETRICAL COOLING ELEMENTS

BACKGROUND OF THE INVENTION

1. Field of the Invention

This invention relates generally to gas turbine engines and, more specifically, to cooled turbine shrouds and impingement baffles that cool the shrouds.

2. Description of Related Art

In a gas turbine engine, air is pressurized in a compressor, mixed with fuel in a combustor, and ignited for generating hot combustion gases which flow downstream through one or more turbine stages which extract energy therefrom. A high pressure turbine (HPT) first receives the combustion gases from the combustor and extracts energy therefrom for powering the compressor. A low pressure turbine (LPT) downstream of the HPT extracts additional energy for providing output energy used for powering a fan disposed upstream of the compressor in a typical aircraft gas turbine engine application. In an industrial or a marine gas turbine engine, the LPT drives an output shaft for powering a generator or propellers of a ship. Shafts may also be used to drive helicopter blades or propellers of prop jet engines.

The HPT includes a stationary turbine nozzle having a plurality of circumferentially spaced apart stator vanes or turbine nozzles which control discharge of combustion gases from the combustor. The HPT also includes at least one rotor stage having a plurality of circumferentially spaced apart turbine rotor blades extending radially outwardly from a rotor disk. The blades include airfoils which receive combustion gases from the nozzle and extract energy therefrom for rotating the rotor disk and, in turn, rotating the compressor. The airfoils are typically hollow and include internal cooling circuits therein through which a portion of pressurized air bled from the compressor is channeled for cooling the blades.

Surrounding the rotor blades is an annular turbine shroud fixedly joined to a surrounding stator casing. The shroud is suspended closely atop the blade tips for providing a small gap or tip clearance therebetween. The tip clearance should be as small as possible to provide an effective fluid seal thereat during operation for minimizing the amount of combustion gas leakage therethrough for maximizing efficiency of operation of the engine. However, due to differential thermal expansion and contraction of the rotor blades and surrounding turbine shroud, the blade tips occasionally rub against the inner surface of the shroud causing abrasion wear.

Since the blade tips are at the radially outermost end of the rotor blades and are directly exposed to the hot combustion gases, they are difficult to cool and the life of the blade is thereby limited. The blade tips are typically in the form of squealer rib extensions of the pressure and suction sides of the airfoil, extending outwardly from a tip floor. Cooling air is channeled under the floor to cool the ribs by conduction and film cooling holes may extend through the floor to film cool the exposed ribs.

Since the turbine shroud is also exposed to the hot combustion gases, it too is also cooled by bleeding a portion of the pressurized air from the compressor, which is typically channeled in impingement cooling against the radially outer surface of the turbine shroud. Turbine shrouds typically also include film cooling holes extending radially therethrough with outlets on the radially inner surface of the shroud from which is discharged the cooling air in a film for cooling the inner surface of the shroud.

Impingement cooling of the shroud is also used. Baffles incorporate impingement cooling holes or apertures to direct cooling air against the back or radially outer surface of the shroud to achieve impingement cooling thereof. A relatively large amount of impingement cooling air is generally required for effective impingement cooling which decreases engine efficiency. Cooling air uses power from the engine and therefore causes the engine to use more fuel. Impingement cooling air is generally supplied to a plenum radially adjacent the shroud. The cooling air is supplied through inlet ports. The impingement holes are typically arranged in a circumferentially symmetric pattern with respect to an axis of rotation of arcuate shroud segments and corresponding baffles, thus, providing a substantially uniform circumferential discharge of the cooling air through the shroud.

In a high pressure turbine, the temperatures are not always circumferentially uniform and static components, such as turbine shrouds, in the flowpath can experience hot streaks. These hot streaks are due to the placement of combustor burners and also due to their location relative to static turbine nozzle airfoils. Pressure wakes from upstream turbine nozzle airfoils can locally reduce film and convective cooling in wake regions of the static component by reducing local pressure gradients and, thus, reduce film cooling air flow. The pressure wakes may also cause leakage flow of cooling air between a front face of the shroud and the upstream nozzle to be reduced in the high pressure areas, further increasing the local temperature of the shroud leading edge in this region. This effect may be particularly severe with new high performance nozzle designs incorporating 3-D aerodynamics and which are characterized by more severe pressure gradients at the flowpath edges. Local hot regions can result in oxidation and eventual burn through of the part. This can result in premature failure of the part and/or high scrap rates at overhaul.

It is desirable to provide a turbine shroud cooling system that accommodates circumferential heating gradients while minimizing the amount of cooling airflow, loss of engine efficiency, and fuel consumption.

SUMMARY OF THE INVENTION

A turbine shroud assembly asymmetrical cooling element such as a shroud segment or a baffle includes an arcuate panel. The panel has a plurality of cooling apertures extending through the panel and an axially extending midline of the panel parallel to an axis of rotation of the arcuate panel. A symmetric portion of the cooling apertures have a symmetrical density of aperture inlets that is symmetric with respect to the axially extending midline. An asymmetric portion of the cooling apertures have an asymmetrical density of aperture inlets that is asymmetric with respect to the axially extending midline.

One exemplary cooling element includes a high density area of the cooling apertures in the asymmetric portion having a higher density of aperture inlets than in the symmetric portion. A low density area of the cooling apertures in the asymmetric portion has a lower density of aperture inlets than in the symmetric portion of the cooling apertures. The exemplary embodiment of the panels include the high density area of the cooling apertures being located in the wake region of the arcuate panels.

The turbine shroud assembly and its asymmetrical cooling elements, such as shroud segments and baffles reduce the degree of circumferential hot streaking due to their location relative to static turbine nozzle airfoils. The asymmetrical cooling elements reduce the degree of circumferential hot streaking due to their location in wake regions from pressure wakes from upstream turbine nozzle airfoils. The asymmetrical cooling elements locally tailor film and convective cooling in wake regions of the static component by reducing local pressure gradients and, thus, increase film cooling air flow in the wake regions.

The asymmetrical cooling elements reduce heating due to the pressure wakes causing reduced leakage flow of cooling air between a front face of the shroud and the upstream nozzle in the high pressure areas. Thus the asymmetrical cooling elements reduce or eliminate local hot regions and prevent or delay oxidation and eventual burn through of the part and also they can prevent or delay premature failure of the part and/or high scrap rates at overhaul. The asymmetrical cooling elements provide a turbine shroud cooling system that accommodates circumferential heating gradients while minimizing the amount of cooling airflow, loss of engine efficiency, and fuel consumption.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
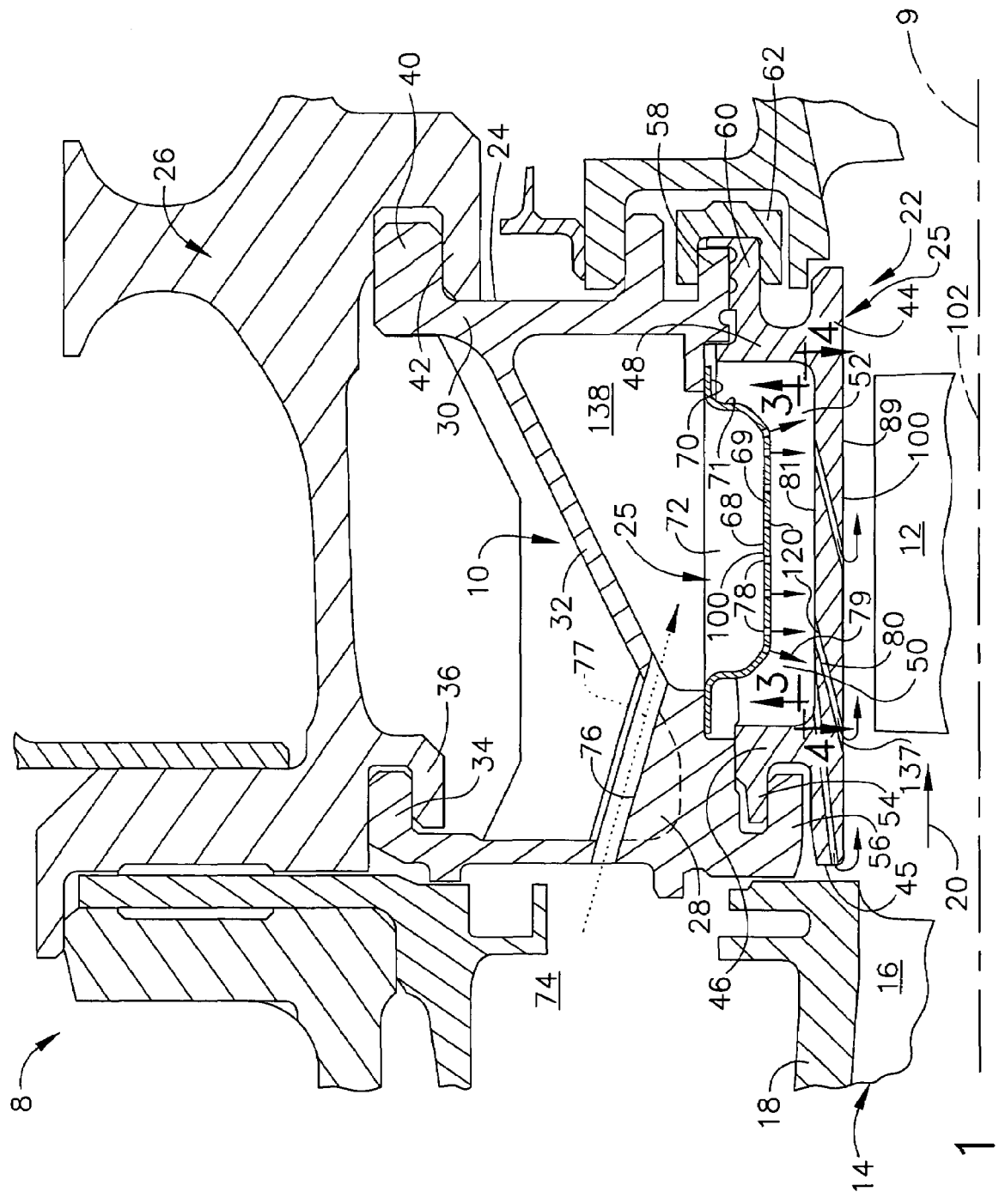
FIG. 1 is an axial sectional view illustration of a gas turbine engine high pressure turbine section with a shroud cooling assembly having asymmetrical patterns of shroud cooling apertures.

Illustrated in cross-section in FIG. 1 is a portion of a gas turbine engine high pressure turbine section 8 having a turbine shroud assembly 10 disposed in closely surrounding radial relation with turbine blades 12. A turbine nozzle 14 includes a plurality of fixed vanes 16 affixed to an outer band 18 for directing a core engine gas stream 20 from a combustor (not shown) through the high pressure turbine section. The shroud assembly 10 includes an annular shroud 11 having an annular array of arcuate shroud segments 22 which are held and supported in position by an annular array of arcuate hanger segments 24, all of which are circumferentially disposed about an engine centerline axis 9. The arcuate hanger segments 24 are in turn supported by an engine outer casing 26.

Each hanger segment 24 includes a forward or upstream rail 28 and an aft or downstream rail 30 and a body panel 32 therebetween. The upstream rail 28 has a rearwardly extending aft flange 34 which radially overlaps a forwardly extending casing flange 36 carried by the outer casing 26. Similarly, the downstream rail 30 has a rearwardly extending aft flange 40 in radially overlapping relation with a forwardly extending outer case flange 42 to support the hanger segments 24 from the engine outer casing 26.

Figure 2:
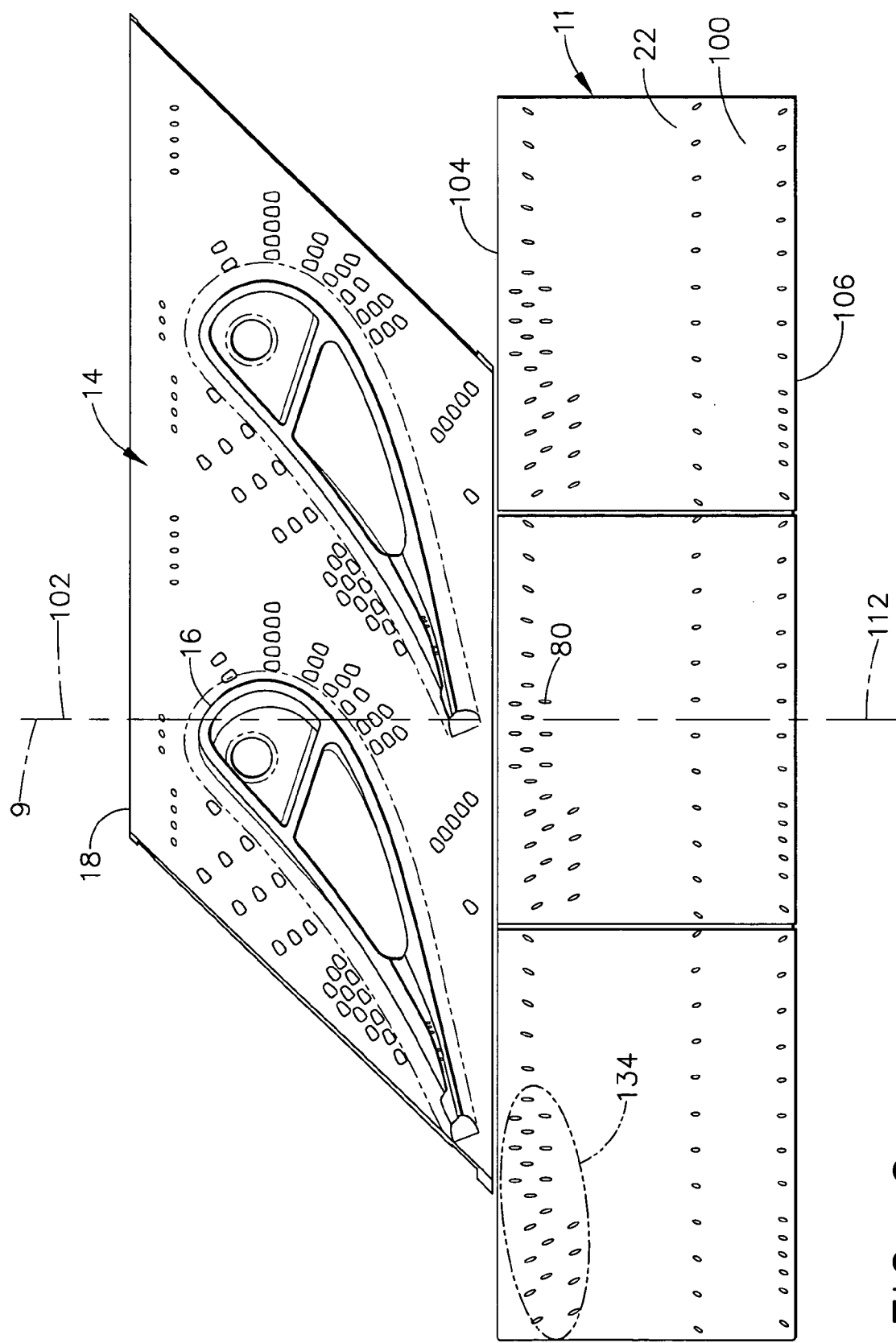
FIG. 2 is a planform view illustration of a turbine nozzle and downstream shroud segments of the high pressure turbine section illustrated in FIG. 1.

Referring to FIGS. 1 and 2, each shroud segment 22, another turbine shroud assembly asymmetrical cooling element 25, has a base 44 with radially outwardly extending forward and aft rails 46 and 48, respectively. The forward and aft rails 46 and 48 are joined by radially outwardly extending and angularly spaced apart side rails 50 forming a shroud segment cavity 52. The shroud segment forward rail 46 has a forwardly extending flange 54 which overlaps a rear flange 56 rearwardly extending from the hanger segment forward rail 28 at a location radially inward from aft flange 34. A hanger flange 58 extends rearwardly from hanger segment aft rail 30 at a location radially inwardly from the aft flange 40 and is held in overlapping relation with an underlaying flange 60 rearwardly extending from the shroud segment aft rail 48 by an annular retaining ring 62 which has a C-shaped cross segment.

Turbine shroud assembly asymmetrical cooling elements 25 in the form of pan-shaped baffles 68 are affixed at their rims 70 to the hanger segments 24 by suitable means, such as brazing, at angularly spaced apart positions such that each baffle is centrally disposed in each shroud segment cavity 52. A shroud chamber 138 is radially disposed and defined between each of the hanger segments 24 and the bases 44. Each baffle 68, thus, defines with the hanger segment to which it is affixed a baffle plenum 72 within the shroud chamber 138. Each hanger segment may mount a number of, for example three, shroud segments and a baffle segment consisting of a corresponding number of, for example three, circumferentially spaced baffles 68, one associated with each shroud segment. Each baffle plenum 72 then serves the corresponding number of baffles and shroud segments. The baffle 68 include sidewalls 71 adjacent a bottom wall 69.

High pressure shroud cooling air 77 extracted from the output of a compressor (not shown) immediately ahead of the combustor is routed to an annular nozzle plenum 74 from which cooling air is fed into each baffle plenum through metering holes 76 provided in the hanger segment forward rails 28. The metering holes 76 convey the high pressure cooling air 77 directly from the nozzle plenum 74 to the baffle plenums 72 to minimize leakage losses. From the baffle plenums, the high pressure cooling air 77 is fed through impingement cooling apertures 78 in the bottom wall 69 of the baffles 68 as impingement cooling airstreams 79 impinging on radially outer back surfaces 81 of the shroud segment bases 44. The bottom walls 69 are arcuate panels 100 of the baffles 68. Each of the panels 100 includes opposite axially spaced apart forward and aft ends 104 and 106 and is circumscribed about an axis of rotation 102 which is co-linear with the engine centerline axis 9. Each of the panels 100 includes an axially extending midline 112 parallel to the axis of rotation 102.

The cooling air 77 then flows radially inwardly into and through a plurality of axially angled elongated convection cooling apertures 80 through the shroud segment bases 44 to provide convection cooling of the shroud. The convection cooling apertures 80 include convection aperture inlets 120 at the back surface 81 and aperture outlets 137 at the radially inner front surface 89 of the shroud segment bases 44. The shroud segment bases 44 are also arcuate panels 100 of the shroud segments 22 and are circumscribed about the axis of rotation 102 and includes the axially extending midlines 112 parallel to the axis of rotation 102. A forwardly located first portion 93 of the convection cooling apertures 80 are axially angled forwardly or upstream 91 with respect to the engine centerline axis 9 and a rearwardly located second portion 95 of the convection cooling apertures 80 are axially angled rearwardly or downstream 83 with respect to the engine centerline axis 9.

Figure 4:
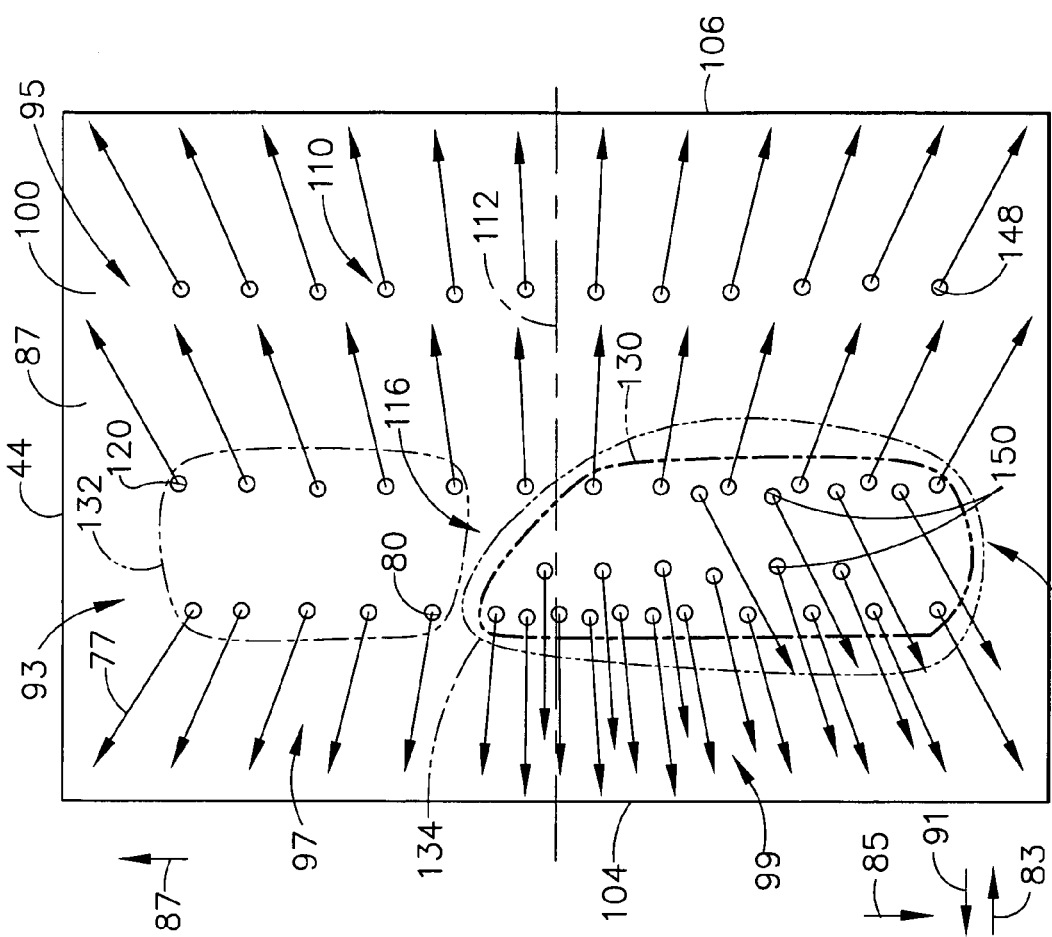
FIG. 4 is a planform view illustration of the shroud segment illustrated and taken along 4—4 in FIG. 1.

A third portion 97 of the convection cooling apertures 80, which may or may not include all of the first portion 93, may also be circumferentially angled in a clockwise direction 87 with respect to a midline 112 of the base 44. A fourth portion 99 of the convection cooling apertures 80 may also be circumferentially angled in a counter-clockwise direction 85 with respect to the midline 112 of the base 44, which is parallel to the engine centerline axis 9, as illustrated in FIG. 4. Generally, the third portion 97 of the convection cooling apertures 80 are located in the clockwise direction 87 from the midline 112 and the fourth portion 99 of the convection cooling apertures 80 are located in the counterclockwise direction 85 from the midline 112. The angling of the convection cooling apertures 80 increase the amount of convection cooling they provide for the base 44. Upon exiting the convection cooling apertures 80 passages, the cooling air 77 flows rearwardly or downstream with the main gas stream along radially inner surfaces 89 of the shroud segments 22 to film cool the shroud.

Pressure wakes from the vanes 16 of the turbine nozzle 14 can locally reduce film and convective cooling in wake regions 134 of downstream static components such as the shroud segments 22, illustrated in FIG. 2, by reducing local pressure gradients and, thus, reducing the flow of cooling air 77 through the convection cooling apertures 80 illustrated in FIG. 2. This reduces convective and film cooling effectiveness. The pressure wakes may also cause leakage flow of cooling air between a radial forward end surface 45 of the shroud segment 22 and the upstream turbine nozzle 14 to be reduced in the high pressure areas, further increasing the local temperature of the shroud leading edge in this region. This effect may be particularly severe with new high performance nozzle designs incorporating 3-D aerodynamics and which are characterized by more severe pressure gradients at the flowpath edges. Local hot regions can result in oxidation and eventual burn through of turbine parts such as the shroud in this area. This can result in premature failure of the part and/or high scrap rates at overhaul.

Figure 3:
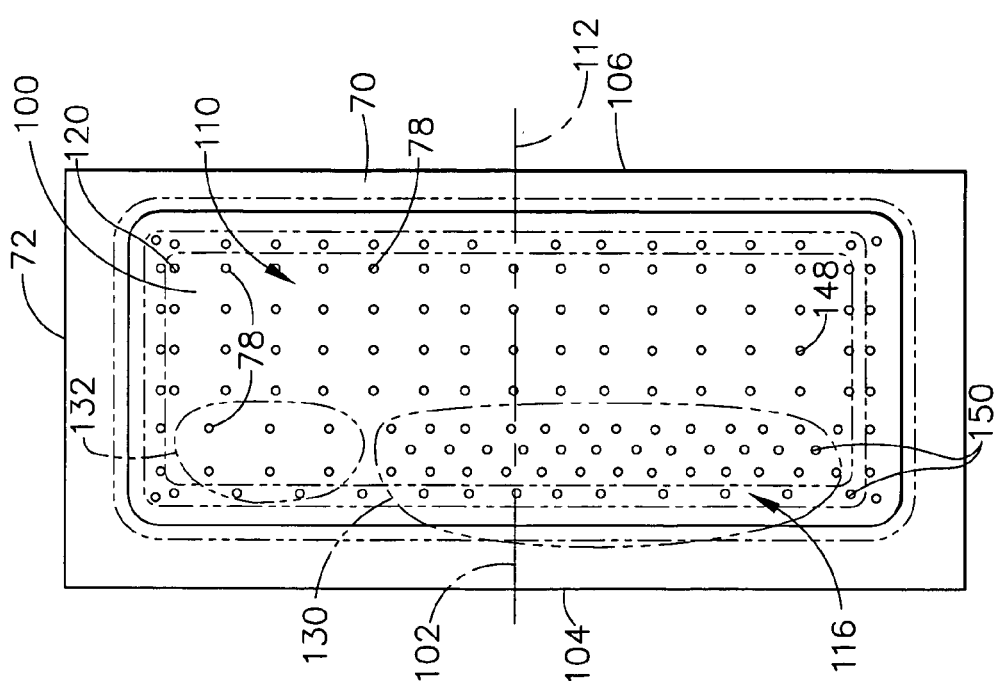
FIG. 3 is a planform view illustration of a baffle illustrated and taken along 3—3 in FIG. 1.

The impingement cooling apertures 78 in the arcuate panels 100 of the baffles 68 and the convection cooling apertures 80 through the shroud segment bases 44 or the arcuate panels 100 of the shroud segments 22 include symmetric and asymmetric portions 110 and 116 of the cooling apertures 78 and 80. The symmetric portions 110 have a symmetrical density of aperture inlets 120 of the cooling apertures 78 and 80 that are symmetric with respect to the axially extending midline 112. The asymmetric portion 116 of the cooling apertures 78 and 80 have an asymmetrical density of the aperture inlets 120 of the cooling apertures 78 and 80 that is asymmetric with respect to the axially extending midline 112. The cooling elements 25 may include a high density area 130 of the cooling apertures 78 and 80 in the asymmetric portion 116 in which the high density area 130 has a higher density of aperture inlets 120 than in the symmetric portion 110 as illustrated in FIGS. 3 and 4. Other embodiments of the cooling elements 25 may include a low density area 132 of the cooling apertures 78 and 80 in the asymmetric portion 116 having a lower density of the aperture inlets 120 than in the symmetric portion 110 of the cooling apertures 78 and 80. The exemplary embodiment of the panels 100 illustrated herein include the high density area 130 of the cooling apertures 78 and 80 being located in the wake region 134 of the arcuate panels 100.

The density variation of the aperture inlets in the exemplary illustration herein is accomplished by starting with an even symmetrical pattern of cooling apertures and aperture inlets 120 evenly spaced in rows 148. The high density area 130 has an increased number or density of cooling apertures and their aperture inlets 120 may be formed with additional cooling apertures 150 and their aperture inlets 120 between the evenly spaced rows 148. The low density area 132 has a decreased number or density of cooling apertures and their aperture inlets 120 may be formed by removing cooling apertures and their aperture inlets 120 from the evenly spaced rows 148. By both adding cooling apertures in the high density area 130 and removing cooling apertures in the low density area 132 total flow to the shroud is maintained while accommodating circumferential variation of pressure drops and heating around the shroud and preventing hot streaks on the shroud along the high pressure wakes of the turbine nozzle.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

The invention claimed is:

1. A turbine shroud assembly cooling element comprising:
   an arcuate turbine shroud panel circumscribed about an axis of rotation and having opposite axially spaced apart forward and aft ends,
   a plurality of cooling apertures extending through the panel,
   an axially extending midline of the panel parallel to the axis of rotation wherein the cooling element is a baffle and the cooling apertures are impingement apertures,
   a symmetric portion of the cooling apertures having a symmetrical density of aperture inlets that is symmetric with respect to the axially extending midline, and
   an asymmetric portion of the cooling apertures having an asymmetrical density of aperture inlets that is asymmetric with respect to the axially extending midline.

2. A cooling element as claimed in claim 1 further comprising a high density area of the impingement apertures in the asymmetric portion of the impingement apertures and the high density area having a higher density of aperture inlets than in the symmetric portion of the impingement apertures.

3. A cooling element as claimed in claim 2 further comprising a low density area of the impingement apertures in the asymmetric portion of the impingement apertures and the low density area having a lower density of aperture inlets than an the symmetric portion of the impingement apertures.

4. A turbine shroud assembly cooling element comprising:
   an arcuate turbine shroud panel circumscribing an axis of rotation and having opposite axially spaced apart forward and aft ends,
   a plurality of cooling apertures extending through the panel,
   an axially extending midline of the panel parallel to the axis of rotation,
   a symmetric portion of the cooling apertures having a symmetrical density of aperture inlets being symmetric with respect to the axially extending midline,
   an asymmetric portion of the cooling apertures having an asymmetrical density of aperture inlets being asymmetric with respect to the axially extending midline,
   the cooling element being a shroud segment, the arcuate panel being a base, and the cooling apertures being convection cooling apertures,
   a high density area of the convection cooling apertures in the asymmetric portion of the convection cooling apertures, the high density area having a higher density of aperture inlets than in the symmetric portion of the convection cooling apertures, a low density area of the convection cooling apertures in the asymmetric portion of the convection cooling apertures, the low density area having a lower density of aperture inlets than in the symmetric portion of the convection cooling apertures, a first portion of the convection cooling apertures being axially angled forwardly with respect to the axis of rotation, a second portion of the convection cooling apertures being axially angled rearwardly with respect to the axis of rotation, and a third portion of the convection cooling apertures being circumferentially angled in a clockwise direction with respect to the midline of the base.

5. A turbine shroud assembly cooling element comprising:

an arcuate turbine shroud panel circumscribing an axis of rotation and having opposite axially spaced apart forward and aft ends, a plurality of cooling apertures extending through the panel, an axially extending midline of the panel parallel to the axis of rotation, a symmetric portion of the cooling apertures having a symmetrical density of aperture inlets being symmetric with respect to the axially extending midline, an asymmetric portion of the cooling apertures having an asymmetrical density of aperture inlets being asymmetric with respect to the axially extending midline, the cooling element being a shroud segment, the arcuate panel being a base, and the cooling apertures being convection cooling apertures, a high density area of the convection cooling apertures in the asymmetric portion of the convection cooling apertures, the high density area having a higher density of aperture inlets than in the symmetric portion of the convection cooling apertures, a low density area of the convection cooling apertures in the asymmetric portion of the convection cooling apertures, the low density area having a lower density of aperture inlets than in the symmetric portion of the convection cooling apertures, a first portion of the convection cooling apertures being axially angled forwardly with respect to the axis of rotation, a second portion of the convection cooling apertures being axially angled rearwardly with respect to the axis of rotation, and a fourth portion of the convection cooling apertures being circumferentially angled in a counter-clockwise direction with respect to the midline of the base.

6. A turbine shroud assembly comprising:

a plurality of arcuate shroud segments circumferentially disposed about an engine centerline axis, each of the shroud segments including a base having a radially outer back surface, a radially inner front surface, and opposite axially spaced apart upstream and downstream ends, a plurality of angled elongated convection cooling apertures extending through the base with convection aperture inlets at the back surface and aperture outlets at the radially inner front surface, a plurality of arcuate hanger segments supporting the shroud segments and secured to a gas turbine engine outer casing, a shroud chamber radially disposed between each of the hanger segments and bases, a pan-shaped baffle radially disposed in the shroud chamber between each of the hanger segments and bases and defining a baffle plenum in the shroud chamber and radially outwardly of the baffle, a metering hole disposed through each of the hanger segments and leading to the baffle plenum, a plurality of impingement apertures having impingement aperture inlets through a panel of the baffle and generally oriented towards the base, the panel being radially spaced apart from and generally concentric with the base, parallel axially extending midlines of the panel and the base, the midlines being parallel to the engine centerline axis, asymmetric portions of the cooling apertures having asymmetrical densities of aperture inlets that are asymmetric with respect to the axially extending midlines, a high density area of the impingement apertures in the asymmetric portion of the impingement apertures, and the high density area having a higher density of aperture inlets than in a symmetric portion of the impingement apertures.

7. An assembly as claimed in claim 6 further comprising a low density area of the impingement apertures in the asymmetric portion of the impingement apertures and the low density area having a lower density of aperture inlets than in the symmetric portion of the impingement apertures.

8. A turbine shroud assembly comprising:

a plurality of arcuate shroud segments circumferentially disposed about an engine centerline axis, each of the shroud segments including a base having a radially outer back surface, a radially inner front surface, and opposite axially spaced apart upstream and downstream ends, a plurality of angled elongated convection cooling apertures extending through the base with convection aperture inlets at the back surface and aperture outlets at the radially inner front surface, a plurality of arcuate hanger segments supporting the shroud segments and secured to a gas turbine engine outer casing, a shroud chamber radially disposed between each of the hanger segments and bases, a pan-shaped baffle radially disposed in the shroud chamber between each of the hanger segments and bases and defining a baffle plenum in the shroud chamber and radially outwardly of the baffle, a metering hole disposed through each of the hanger segments and leading to the baffle plenum, a plurality of impingement apertures having impingement aperture inlets through a panel of the baffle and generally oriented towards the base, the panel being radially spaced apart from and generally concentric with the base, parallel axially extending midlines of the panel and the base, the midlines being parallel to the engine centerline axis, asymmetric portions of the cooling apertures having asymmetrical densities of aperture inlets that are asymmetric with respect to the axially extending midlines, a high density area of the impingement apertures in the asymmetric portion of the impingement apertures and the high density area having a higher density of aperture inlets than in a symmetric portion of the impingement apertures, and a high density area of the convection cooling apertures located in a wake region of the arcuate panel of the shroud segment.

9. An assembly as claimed in claim 8 further comprising a low density area of the impingement apertures in the asymmetric portion of the impingement apertures and the low density area having a lower density of aperture inlets than in the symmetric portion of the impingement apertures.

10. An assembly as claimed in claim 9 further comprising a high density area of the convection cooling apertures in the asymmetric portion of the convection cooling apertures and the high density area having a higher density of aperture inlets than in the symmetric portion of the convection cooling apertures.

11. An assembly as claimed in claim 10 further comprising a low density area of the convection cooling apertures in the asymmetric portion of the convection cooling apertures and the low density area having a lower density of aperture inlets than in the symmetric portion of the convection cooling apertures.

12. An assembly as claimed in claim 11 wherein a first portion of the convection cooling apertures are axially angled upstream.

13. An assembly as claimed in claim 12 further comprising the high density area of the impingement apertures located radially outwardly and circumferentially aligned with the convection cooling apertures located in the wake region of the shroud segment.

* * * * *